US011993167B2

(12) United States Patent
Johansson et al.

(10) Patent No.: US 11,993,167 B2
(45) Date of Patent: May 28, 2024

(54) SNOW PROTECTOR FOR VEHICLE CHARGE PORT

(71) Applicant: Polestar Performance AB, Gothenburg (SE)

(72) Inventors: Niklas Johansson, Gothenburg (SE); Marcus Gustafsson, Gothenburg (SE)

(73) Assignee: POLESTAR PERFORMANCE AB, Gothenburg (SE)

( * ) Notice: Subject to any disclaimer, the term of this patent is extended or adjusted under 35 U.S.C. 154(b) by 15 days.

(21) Appl. No.: 17/531,232

(22) Filed: Nov. 19, 2021

(65) Prior Publication Data
US 2023/0158905 A1    May 25, 2023

(51) Int. Cl.
H02J 7/00    (2006.01)
B60L 53/16    (2019.01)
B60L 53/30    (2019.01)

(52) U.S. Cl.
CPC .............. B60L 53/30 (2019.02); B60L 53/16 (2019.02); H02J 7/0042 (2013.01)

(58) Field of Classification Search
CPC .......... B60L 53/30; B60L 53/16; H02J 7/0042
USPC ...................................................... 320/109
See application file for complete search history.

(56) References Cited

U.S. PATENT DOCUMENTS

| 10,594,071 B2 * | 3/2020 | Kamemura | B60L 53/16 |
| 10,711,506 B2 * | 7/2020 | Rhodes | B60L 53/16 |
| 2011/0309788 A1 * | 12/2011 | Kimble | B63B 17/02 320/101 |
| 2013/0078846 A1 * | 3/2013 | Sasaki | B60L 53/16 439/374 |
| 2015/0042275 A1 * | 2/2015 | Schoener | H01R 13/5219 439/271 |
| 2016/0121744 A1 * | 5/2016 | Meinl | F16J 15/027 320/107 |
| 2016/0137081 A1 * | 5/2016 | Takahashi | B60L 53/14 320/109 |
| 2018/0145442 A1 * | 5/2018 | Sanchez Patino | B29C 45/04 |
| 2019/0111795 A1 * | 4/2019 | Rhodes | E05F 15/76 |
| 2019/0267749 A1 * | 8/2019 | Kamemura | H01R 13/52 |
| 2022/0332199 A1 * | 10/2022 | Cho | H01R 13/447 |
| 2022/0340025 A1 * | 10/2022 | Hitchcock | H01R 13/5213 |
| 2022/0381080 A1 * | 12/2022 | Vlk | E05F 15/63 |
| 2023/0031098 A1 * | 2/2023 | Lesniak | H01R 13/5213 |
| 2023/0151669 A1 * | 5/2023 | Scott-Collins | H01R 13/5202 439/306 |

(Continued)

*Primary Examiner* — Brian Ngo
(74) *Attorney, Agent, or Firm* — Kilpatrick Townsend & Stockton, LLP

(57) ABSTRACT

A charge port cover, sized and shaped for selective concealment of a charge port recess of a vehicle during vehicle connection via a charging cable to an external charging source. The charge port cover includes a body plate member comprised of rigid or semi-rigid material. The body plate member includes a planar front face and a planar rear face juxtaposed in opposite orientations to one another. The body plate member also includes an outer edge surface joining and defining a perimeter of the front face and the rear face, the outer edge surface having a thin profile. The body plate member also includes a charging connector aperture, located at an interior spaced-apart location from the perimeter, defining a passageway between the planar front face and the planar rear face and configured to selectively receive a charging cable therethrough.

17 Claims, 11 Drawing Sheets

(56) References Cited

U.S. PATENT DOCUMENTS

2023/0191926 A1\* 6/2023 Cretin .................. H01R 13/629
439/589

\* cited by examiner

SNOW PROTECTOR FOR VEHICLE CHARGE PORT

TECHNICAL FIELD

The present disclosure relates generally to a cover for a charge port of an electric vehicle, and more particularly, to a charge port cover sized and shaped for selective concealment of a charge port recess of an electric vehicle from snow, ice, or other debris during charging.

BACKGROUND

In recent years, adoption of electric vehicles and hybrid vehicles has increased in response to improved technology and increasing concerns over the environmental impact of internal combustion engines. Such electric vehicles and hybrid electric vehicles each include components for electric power storage, such as a battery. Power stored in the electric power storage components is used for driving the electric motor. The battery mounted in the electric vehicle is generally charged with power supplied from a charge facility external to the vehicle. This power is supplied using a charging cable that is inserted into a charge port of the electric vehicle coupled to a receptacle therein. In general, a charge port includes receptacles into which the charging cable can be coupled as well as a surrounding recessed area that extends inward from the exterior vehicle surface.

In winter weather conditions, snow and ice can quickly accumulate in the charge port while the electric vehicle is charging. This accumulation can reduce user access to the charge port and requires the user to endure the cold weather while freeing the charging cable and clearing the charge port area of the vehicle.

SUMMARY

Embodiments of the present disclosure are directed to a protective cover for a charge port of an electric vehicle during charging. Specifically, the cover is configured for protection when a charging cable is electrically connecting the electric vehicle to a charging source. Embodiments are disclosed of a cover that can prevent snow, ice, debris, and other material from entering the charge port recess of the vehicle during charging. Embodiments of the protective cover can further dually function as an ice scrapper or snow removal tool for clearing snow, ice, and debris from the vehicle.

Embodiments include a charge port cover, sized and shaped for selective concealment of a charge port recess of a vehicle during vehicle connection via a charging cable to an external charging source. The charge port cover includes a body plate member comprised of rigid or semi-rigid material. The body plate member includes a planar front face and a planar rear face juxtaposed in opposite orientations to one another. The body plate member also includes an outer edge surface joining and defining a perimeter of the front face and the rear face, the outer edge surface having a thin profile. The body plate member also includes a charging connector aperture, located at an interior spaced-apart location from the perimeter, defining a passageway between the planar front face and the planar rear face and configured to selectively receive a charging cable therethrough. The outer edge surface is shaped and sized for a clearance fit within an outer periphery defining a charge port recess of a vehicle.

In embodiments, a charge port cover can include a body plate member having a perimeter of substantially the same shape and size as the charge port outer profile such that the body can be placed within the charge port with a clearance fit when the charge port is exposed, such as during use. The body plate member further includes a charging connector aperture configured to receive a charging cable of the charging source to establish an electrical connection between the charging source and the power source of the vehicle.

Embodiments of the present disclosure are understood to overcome the difficulties of snow and ice accumulation that tends to occur in the charge port recess of an electric car during inclement winter weather with an advantageous, specially-shaped charge port cover member that blocks snow and ice and which can be dually used as an ice scraper when removed from the confines of a vehicle charge port.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
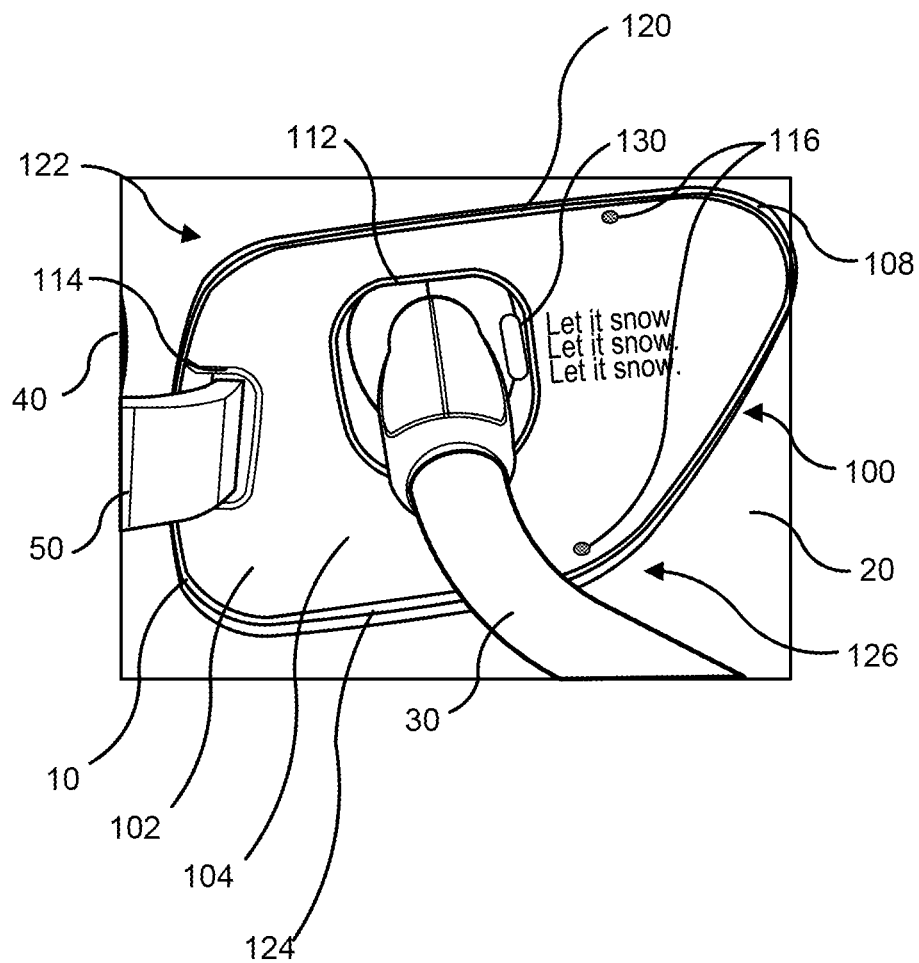
FIG. 1 is a perspective view of a charge port cover extending over a charge port of a vehicle according to an embodiment.
Figure 2:
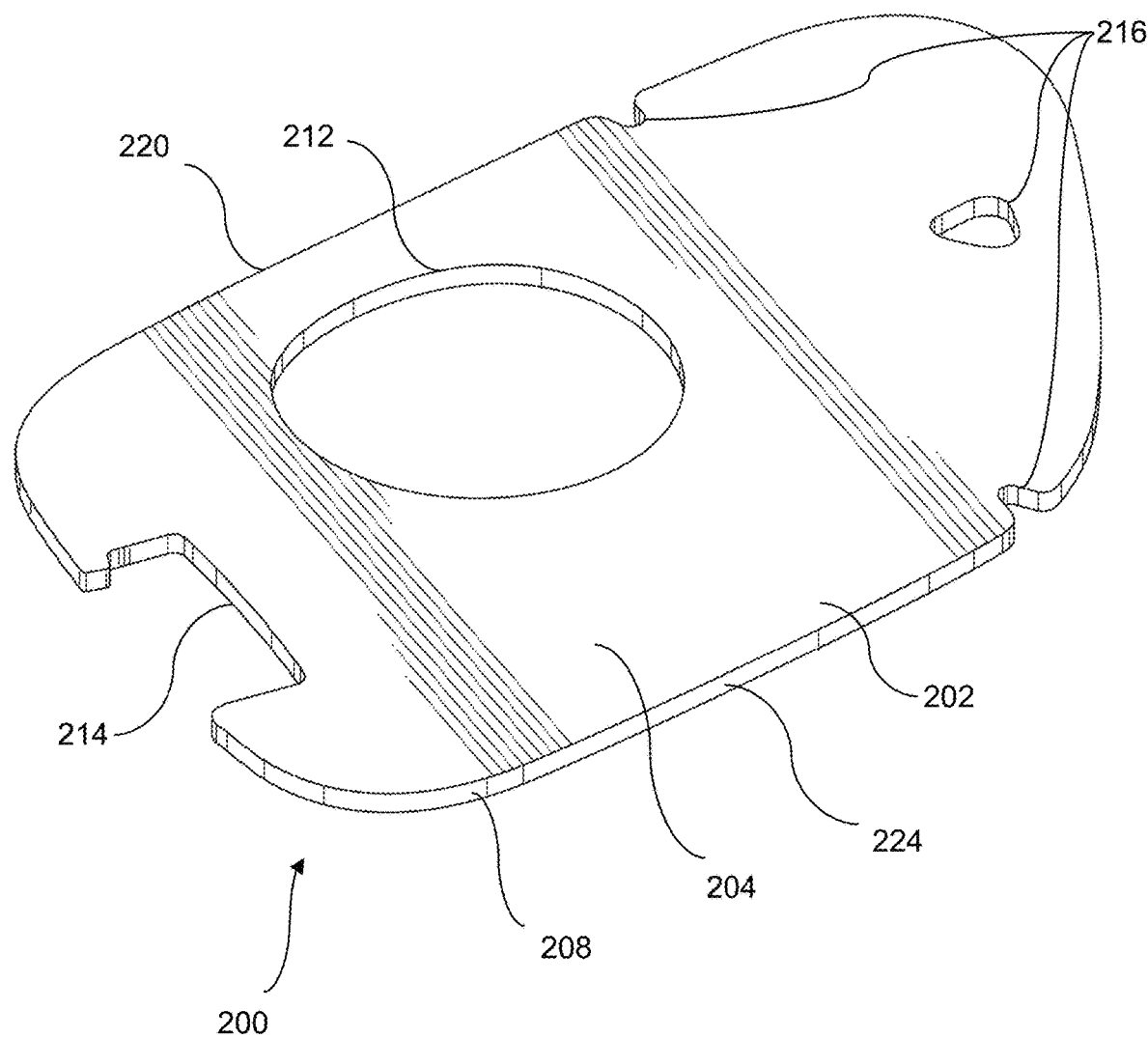
FIG. 2 is a front perspective view of a charge port cover according to an embodiment.
Figure 3:
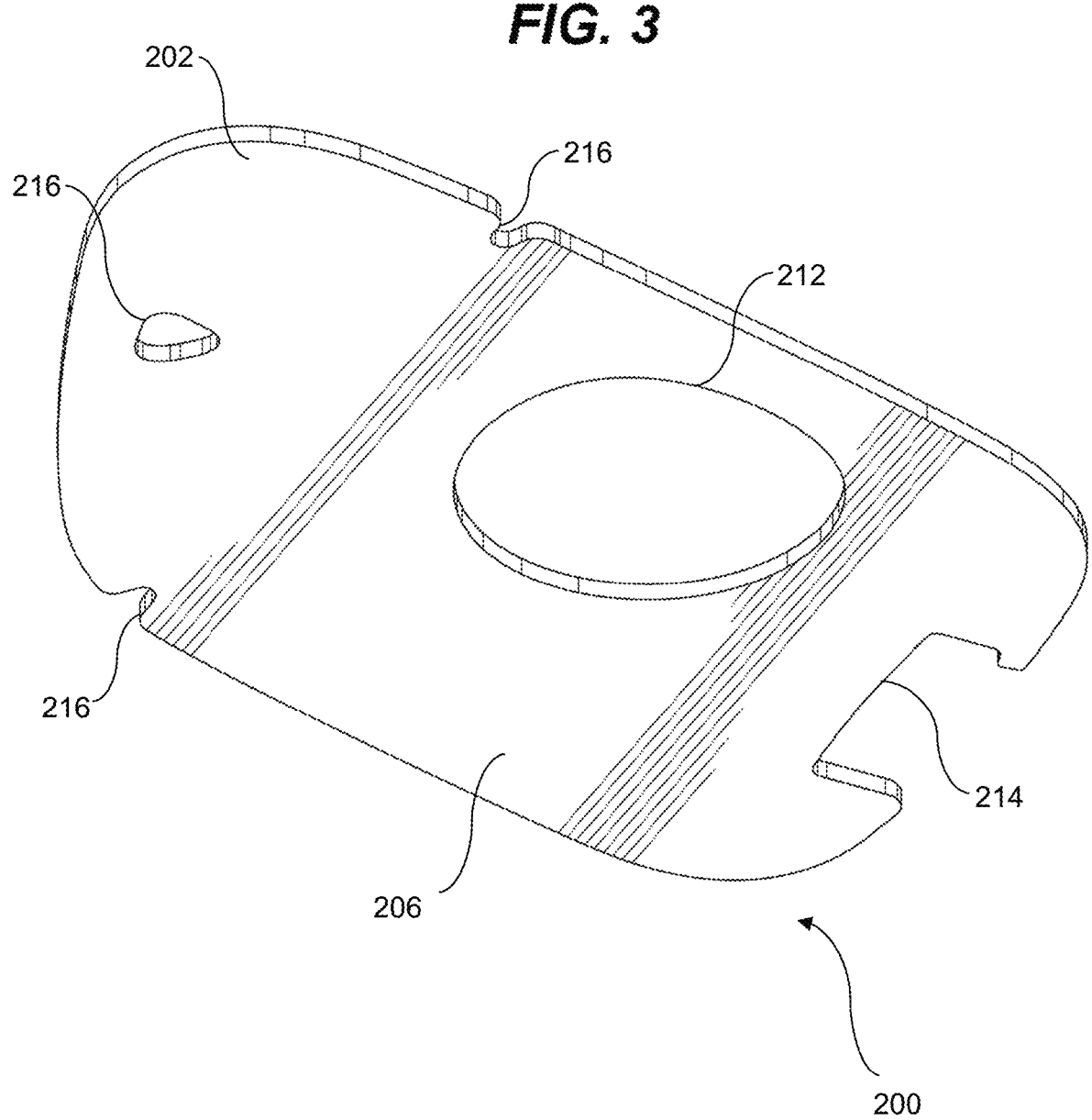
FIG. 3 is a rear perspective view of the charge port cover of FIG. 2 according to an embodiment.
Figure 4:
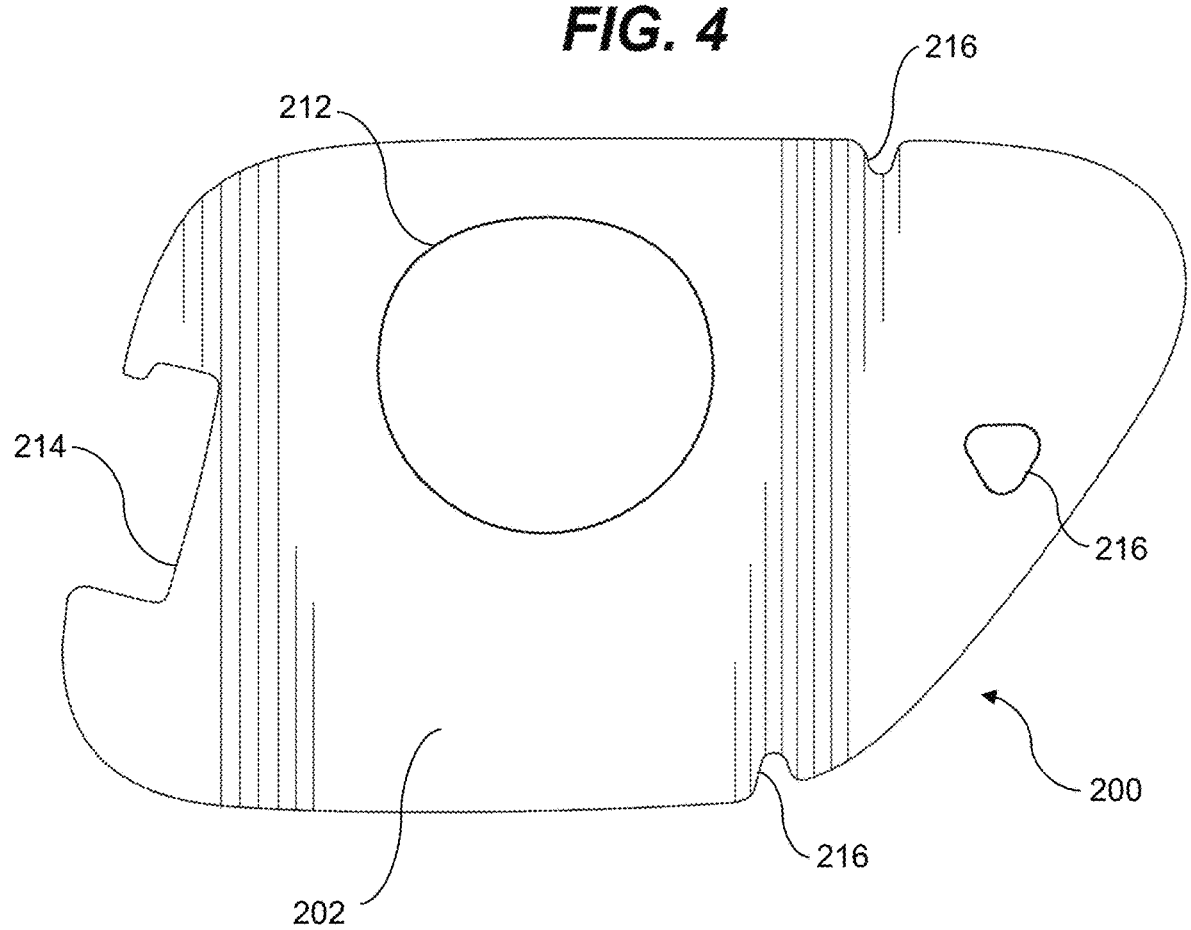
FIG. 4 is a front view of the charge port cover of FIG. 2 according to an embodiment.
Figure 5:
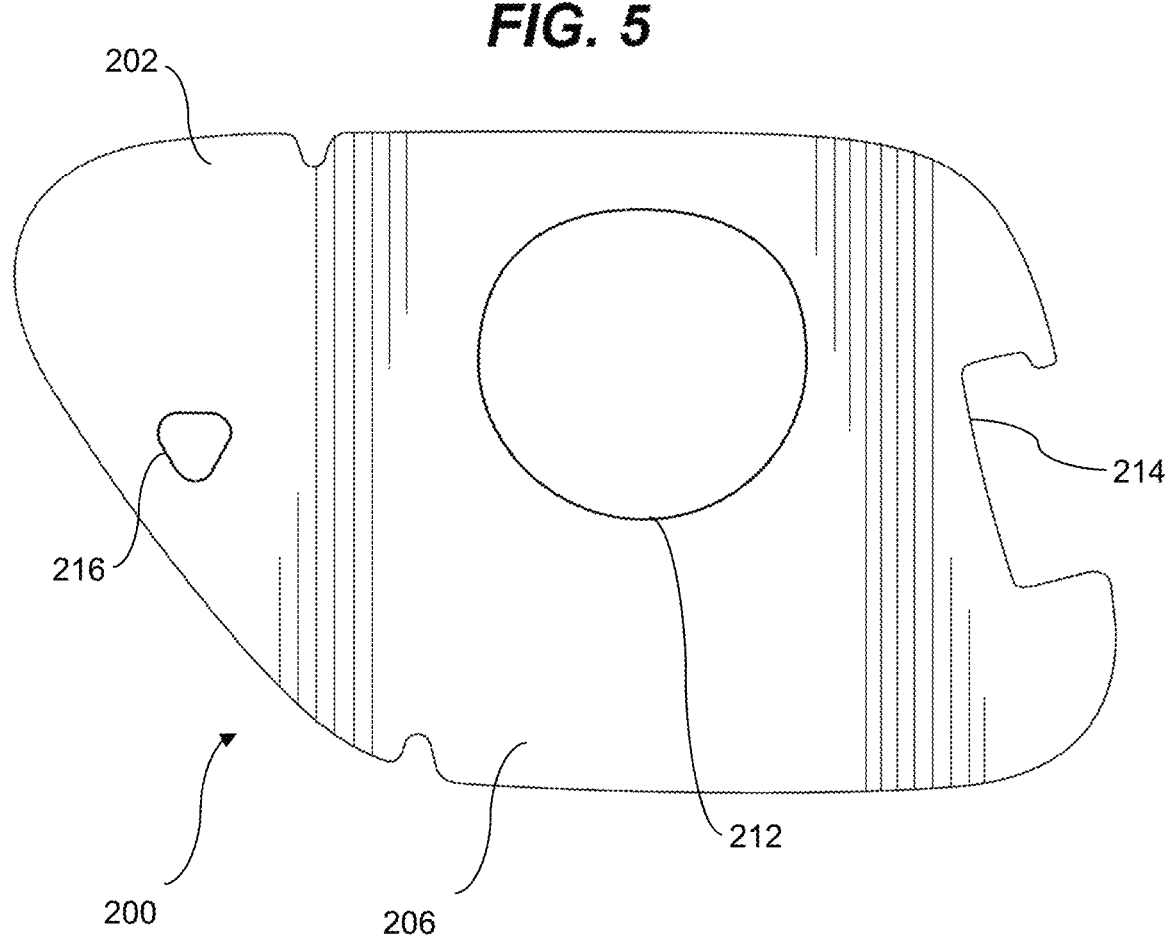
FIG. 5 is a rear view of the charge port cover of FIG. 2 according to an embodiment.
Figure 6:
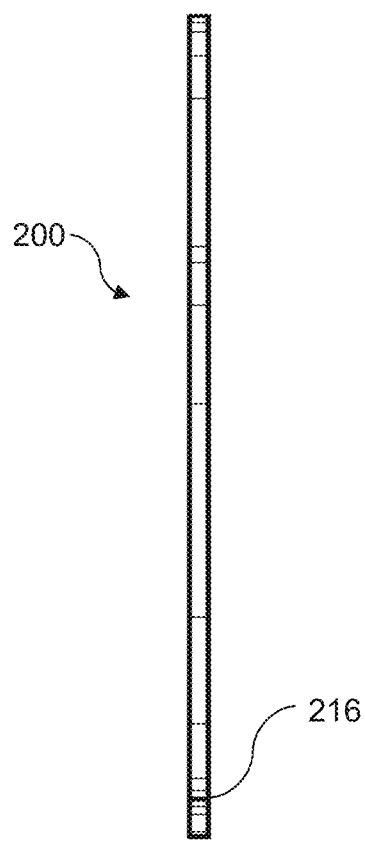
FIG. 6 is a right side view of the charge port cover of FIG. 2 according to an embodiment.
Figure 7:
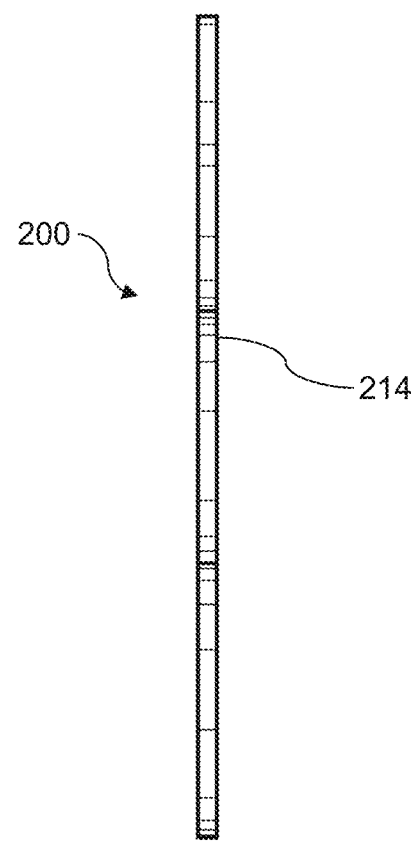
FIG. 7 is a left side view of the charge port cover of FIG. 2 according to an embodiment.
Figure 8:
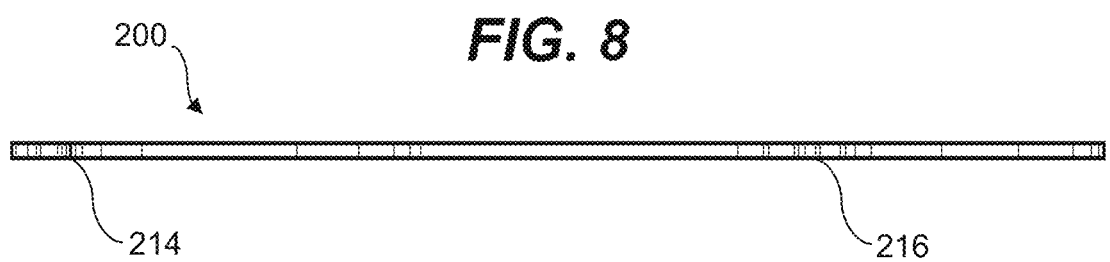
FIG. 8 is a top view of the charge port cover of FIG. 2 according to an embodiment.
Figure 9:
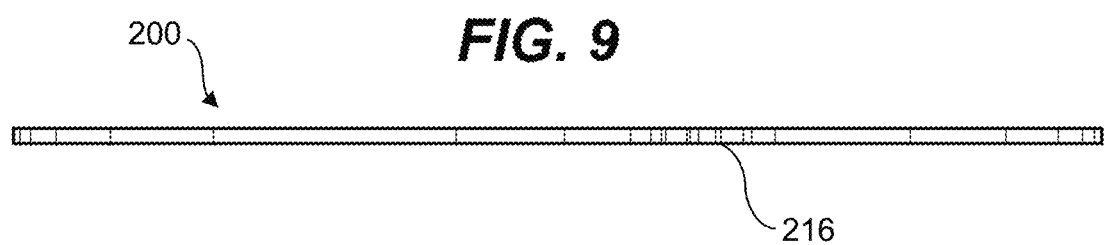
FIG. 9 is a bottom view of the charge port cover of FIG. 2 according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIG. 1, charge port cover 100 is depicted according to an embodiment. Charge port cover 100 includes a body plate member 102. Body plate member 102 includes a planar front face 104, a planar rear face 106, an outer edge surface 108, a charging connector aperture 112, a lid contour 114, and lid support apertures 116. In this embodiment, charge port cover 100 is configured to substantially align with the size and shape of a vehicle charge port 10 for a vehicle 20. The exact shape and dimensions of charge port cover 100 can vary significantly to accommodate the charge ports 10 of different vehicles 20.

Body plate member 102 is generally thin and disc-like in overall shape, although the specific shape is multi-faceted and non-uniform. Body plate member 102 may be comprised of a rigid or semi-rigid material in various embodiments. In some embodiments, body plate member 102 is thin and comprises a thickness of around 3 mm. In some embodiments, the body plate member 102 is made of polymethyl methacrylate (PMMA), for example. Other plastics and/or recyclable and sustainable materials are options for materials as well. In some embodiments, the body plate member 102 is transparent or semi-transparent. In such transparent and semi-transparent embodiments, light can pass through the charge port cover 100, which allows a user to see lights (if present) or other indicators in the interior recess of a charge port 10. Accordingly useful information can be relayed about the vehicle 20 or its charging status during the charging process while in use, for example.

Planar front face 104 and planar rear face 106 are juxtaposed to one another in opposite orientations. In some embodiments, planar front face 104 and planar rear face 106 may generally be oriented in parallel planes in relation to one another. In some embodiments, planar front face 104 and planar rear face 106 may not truly be planar, but instead be somewhat curved across their respective faces and bow inwardly or outwardly. However, embodiments having non-planar faces may nevertheless have a general orientation of the faces that are largely opposite to one another.

An outer edge surface 108 joins and defines a perimeter of the planar front face 104 and planar rear face 106. In general the outer edge surface 108 has a thin profile and provides a fairly hard flat plane of material. The perimeter of the planar front face 104 can take on various shapes, including those with curves or sharp corners and angles. In some embodiments, there is a straight rigid segment 120 of outer edge surface material disposed across the upper portion 122 of the body plate member 102 about the perimeter. In some embodiments, the straight rigid segment 120 functions as an ice scraper and snow removal tool. In some embodiments, the straight rigid segment 120 could further include an additional blade or sharpened wedge of material. In some embodiments, a first segment 120 of an upper portion 122 of the perimeter is parallel to a second straight segment 124 of a lower portion 126 of the perimeter. Charge connector aperture 112 is sized to accommodate charging cable 30. In embodiments, charge connector aperture 112 can be a circle, rectangle, oval, polygon, or other shape depending on the charging cable 30 used. In embodiments, charge connector aperture 112 can be sized so as to not cover charge light indicator 130. In some embodiments, the charging connector aperture 112 is wide enough to allow viewing of lighted portions in the area surrounding the charging cable 30. In other embodiments, charge port cover 100 can comprise partially translucent or translucent material such that charge light indicator 130 can be seen even if covered.

In some embodiments, body plate member 102 is equipped to function as an ice scraper and snow removal tool when not concealing the recess of the charge port 10. In some such embodiments, the charging connector aperture 112 can function to provide a handle grip for use of the charge port cover 100 for ice scrapping and snow removal based on its dimensions and configuration.

Charge ports 10 typically include a lid 40 (partially shown) that is connected to the vehicle 20 by a charge port lid connection apparatus, such as a lid connecter 50 allowing it to be selectably displaceable. The charge port cover 100 accordingly includes a lid contour 114 feature to accommodate such a component. Specifically, lid contour 114 is configured to partially surround lid connector 50 when the lid 40 is in an open position. In some embodiments, the body plate member 102 further comprises at least one lid contour 114 in the perimeter of the outer edge surface 108 that is configured to provide a clearance fit with a charge port lid connection apparatus of the vehicle.

Lid support apertures 116 are configured to accommodate protruding lid supports (not shown), such as rubber stoppers, protrusions, or flanges that are often present within the recessed area of a vehicle charge port 10. Lid supports can be configured to support charge port lids 40 when in a closed position by providing a surface for the lid 40 to rest against. In some embodiments, the body plate member 102 further comprises at least one lid support aperture 116 configured to provide a clearance fit with at least one lid support structure of a charge port lid connection apparatus of the vehicle 20. In embodiments, lid support apertures 116 can instead be lid support contours as shown in FIGS. 2-9.

Charge port cover 100 is operable between two use modes. In a deployed mode, charge port cover 100 can be placed within the well of a vehicle charge port 10 such that the perimeter of charge port cover 100 abuts exterior vehicle body as shown in FIG. 1. In a free use mode, charge port cover 100 can be gripped and handled independently of a vehicle 20. Thus, the size and shape constraints of charge port cover 100 are typically defined by a vehicle's charge port 10 dimensions to meet the requirements of the deployed mode.

In embodiments, when charging cable 30 is not in use and charge port cover 100 is in the deployed mode, charging connector aperture 112 can further serve as an opening from which to grip charge port cover 100 to remove it once the vehicle 20 is sufficiently charged. The close fit of charge port cover 100 to a vehicle's charge port 10 prevents snow or debris from entering the recessed charge port well during the charging process.

When a user desires to charge an electric vehicle 20 the user can place a charge port lid 40 in an open position, position charge port cover 100 over the charge port 10 of the electric vehicle 20, and then proceed to insert a charging cable 30 through the charge port cover 100. Once the charging process is complete, the user can remove the charging cable 30 and charge port cover 100 before closing the charge port lid 40.

When in the free use mode, charge port cover 100 can serve as an ice scraper or snow brush to clear a vehicle's windshield. During such operation, lid contour 114 can serve as a handle with which to grip charge port cover 100 with a user's palm resting against lid contour 114 and the user's fingers gripping charge connector aperture 112.

In embodiments, charge port cover 100 can comprise rounded or treated edges. In embodiments, charge port cover 100 can include rounded or treated edges around only a portion of the exterior edges such that the non-rounded or non-treated edge can be used more effectively as an ice scraper.

In embodiments, charge port cover 100 can be approximately between 2 and 4 mm thick. In embodiments, charge port cover 100 can be approximately between 2.8 and 3.2 mm thick. In embodiments, charge port cover 100 can be 3 mm thick.

Referring now to FIGS. 2-9, charge port cover 200 is shown according to an embodiment. Charge port cover 200 includes a body plate member 202, planar front face 204, planar rear face 206, outer edge surface 208, charging connector aperture 212, lid contour 214, lid support contours and apertures 216, a first straight rigid segment 220, and a second straight rigid segment 224. In embodiments, the body plate member 202, planar front face 204, planar rear face 206, outer edge surface 208, charging connector aperture 212, lid contour 214, lid support contours and apertures 216, first straight rigid segment 220, and a second straight rigid segment 224 should be understood to function substantially similar to the corresponding components in FIG. 1.

Figure 10:
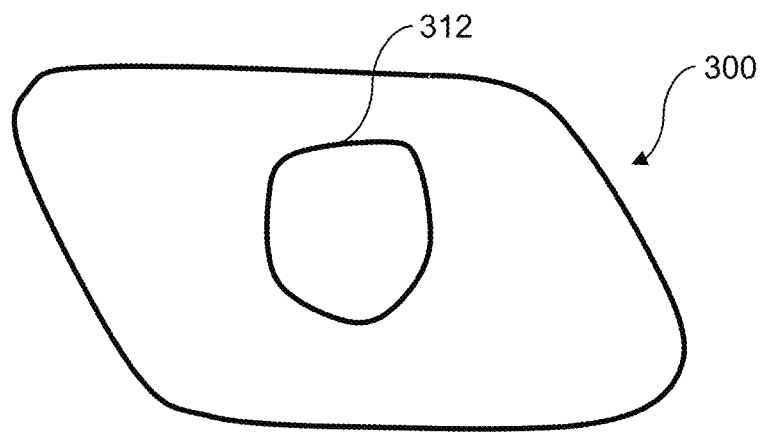
FIG. 10 is a charge port cover with an alternate profile according to an embodiment.
Figure 11:
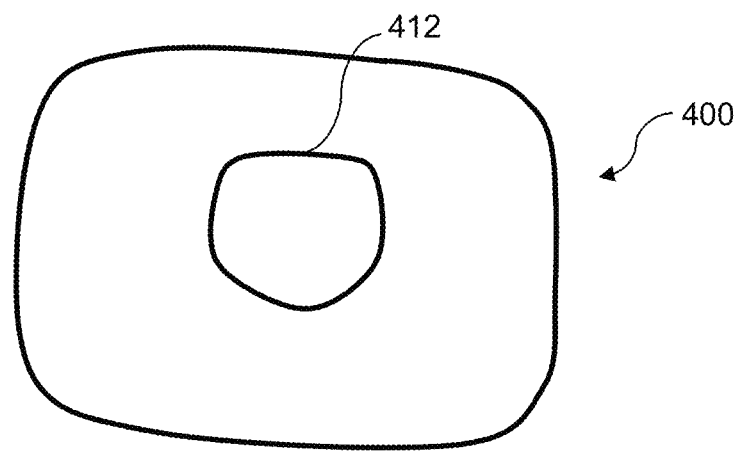
FIG. 11 is a charge port cover with an alternate profile according to an embodiment.
Figure 12:
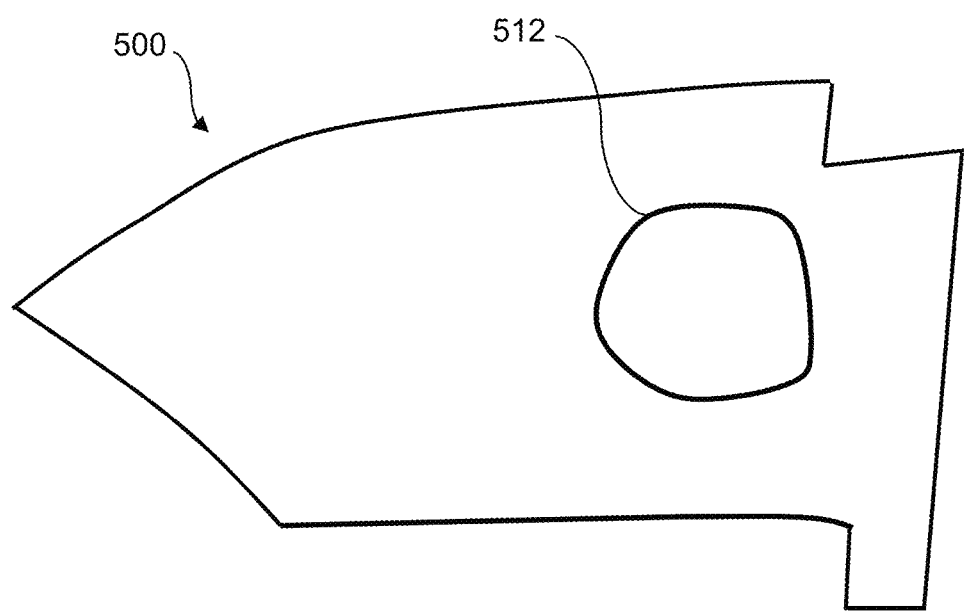
FIG. 12 is a charge port cover with an alternate profile according to an embodiment.

Referring now to FIGS. 10-12, charge port covers 300, 400, and 500 with alternate perimeter shapes are shown according to embodiments. These perimeter shapes can incorporate differently sized charging connector apertures 312, 412, and 512, lid contours, and lid support apertures or contours depending on the type of charging port used and locations of the lid mechanism of a vehicle.

Many of the embodiments discussed thus far are disclosed in the context of charge port covers intended to be used primarily when the vehicle's charge port lid 40 is open. In such embodiments, the charge port covers are removed when the lid 40 is closed. However, in some embodiments, a charge port cover could be designed to stay in place, even when the lid 40 is closed. This way the charge port could also serve as a location for storing a scraper for the vehicle 100. Embodiments permitting such storage can include a body plate made of a material of greater flexibility to accommodate the reduced space parameters of a closed lid. In some embodiments, the charge port cover can include recesses or flexible portions to allow for lid components and lid connector 50 displacement due to lid 40 closing. Numerous designs of varied sizes and shapes are be possible.

Various embodiments of systems, devices, and methods have been described herein. These embodiments are given only by way of example and are not intended to limit the scope of the present disclosure. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the present disclosure.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A charge port cover, sized and shaped for selective concealment of a charge port recess of a vehicle during vehicle connection via a charging cable to an external charging source, comprising:
   a body plate member comprised of rigid or semi-rigid material including:
      a planar front face and a planar rear face juxtaposed in opposite orientations to one another;
      an outer edge surface joining and defining a perimeter of the planar front face and the planar rear face, the outer edge surface having a thin profile; and
      a charging connector aperture, located at an interior spaced-apart location from the perimeter, defining a passageway between the planar front face and the planar rear face and configured to selectively receive the charging cable therethrough,
      wherein the outer edge surface is shaped and sized for a clearance fit within an outer periphery defining the charge port recess of a vehicle extending inwards from an exterior surface of the vehicle.

2. The charge port cover of claim 1, wherein the body plate member is equipped to function as an ice scraper and snow removal tool when not concealing the charge port recess.

3. The charge port cover of claim 2, wherein the perimeter of the body plate member includes an ice scraper edge comprised of a straight rigid segment of an outer edge surface material disposed across an upper portion of the body plate member.

4. The charge port cover of claim 3, wherein the charging connector aperture provides a handle grip for use of the charge port cover for ice scraping and snow removal.

5. The charge port cover of claim 1, wherein the body plate member further comprises at least one lid contour in the perimeter of the outer edge surface that is configured to provide a clearance fit with a charge port lid mechanism of the vehicle.

6. The charge port cover of claim 1, wherein the body plate member further comprises at least one lid support aperture configured to provide a clearance fit with at least one lid support structure of a charge port lid mechanism of the vehicle.

7. The charge port cover of claim 1, wherein the body plate member comprises a thickness between 2.8 mm and 3.2 mm.

8. The charge port cover of claim 1, wherein the body plate member is comprised of polymethyl methacrylate (PMMA).

9. The charge port cover of claim 1, wherein a first segment of an upper portion of the perimeter is parallel to a second segment of a lower portion of the perimeter.

10. The charge port cover of claim 1, wherein the charging connector aperture is wide enough to allow viewing of lighted portions in an area surrounding the charging cable.

11. The charge port cover of claim 1, wherein the body plate member is transparent or semi-transparent.

12. The charge port cover of claim 1, wherein a straight rigid segment of an outer edge surface material is disposed across an upper portion of the body plate member about the perimeter.

13. The charge port cover of claim 1, wherein the body plate member is a rigid material.

14. The charge port cover of claim 1, wherein at least a portion of the outer edge surface includes a sharp edge.

15. The charge port cover of claim 1, further comprising a sharp component coupled to the outer edge surface.

16. The charge port cover of claim 15, wherein:
   the outer edge surface includes a straight segment; and
   the sharp component coupled to the outer edge surface.

17. The charge port cover of claim 1, wherein the charge port cover is removably attachable to the charge port recess.

\* \* \* \* \*